United States Patent
Lapidous

(12) 
(10) Patent No.: US 10,542,029 B2
(45) Date of Patent: *Jan. 21, 2020

(54) SYSTEM AND METHOD FOR SECURITY AND QUALITY ASSESSMENT OF WIRELESS ACCESS POINTS

(71) Applicant: AnchorFree Inc., Menlo Park, CA (US)

(72) Inventor: Eugene Lapidous, Saratoga, CA (US)

(73) Assignee: Pango Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/597,036

(22) Filed: May 16, 2017

(65) Prior Publication Data

US 2017/0251011 A1    Aug. 31, 2017

Related U.S. Application Data

(63) Continuation of application No. 14/574,117, filed on Dec. 17, 2014, now Pat. No. 9,686,302.

(60) Provisional application No. 61/921,781, filed on Dec. 30, 2013.

(51) Int. Cl.
  *H04L 29/06* (2006.01)
  *H04L 9/06* (2006.01)
  *H04W 12/12* (2009.01)
  *H04W 12/00* (2009.01)

(52) U.S. Cl.
  CPC ...... *H04L 63/1433* (2013.01); *H04L 63/0272* (2013.01); *H04W 12/00505* (2019.01); *H04W 12/12* (2013.01)

(58) Field of Classification Search
  CPC ............. H04W 12/08; H04W 12/12; H04W 12/00505; H04L 63/0272; H04L 63/1433
  See application file for complete search history.

(56) References Cited

U.S. PATENT DOCUMENTS

| | | | | |
|---|---|---|---|---|
| 9,602,411 | B2* | 3/2017 | Lapidous | ............ H04L 61/6009 |
| 9,763,099 | B2* | 9/2017 | Lapidous | ............. H04W 12/12 |
| 9,819,513 | B2* | 11/2017 | Lapidous | ............ H04L 12/4641 |
| 9,911,297 | B2* | 3/2018 | Lundy | .................... G08B 21/02 |
| 2007/0079376 | A1* | 4/2007 | Robert | ............... H04L 63/1408 |
| | | | | 726/23 |

(Continued)

*Primary Examiner* — Mohammad A Siddiqi
(74) *Attorney, Agent, or Firm* — David R. Stevens; Stevens Law Group

(57) ABSTRACT

A computer-implemented method for security risk assessment of wireless access point devices, the computer-implemented method comprising: receiving signals from one or more wireless access points by two or more mobile wireless devices visiting said access points, obtaining Basic Service Set Identifiers (BSSID) of visited access points and reporting values derived from BSSID and from an identifier of corresponding mobile device to a first database, receiving a request for a security risk assessment of evaluated wireless access point, said request containing value derived from BSSID of the evaluated access point, searching the first database for one or more entries corresponding to the evaluated access point, and processing search results to assess security risk of the evaluated access point, said processing comprises computing a component of said risk dependent on the count of unique identifiers of mobile devices reported for the evaluated access point.

20 Claims, 9 Drawing Sheets

(56) References Cited

U.S. PATENT DOCUMENTS

| | | | |
|---|---|---|---|
| 2010/0008258 A1* | 1/2010 | Ji | H04W 8/26 370/254 |
| 2013/0097710 A1* | 4/2013 | Basavapatna | H04W 4/02 726/25 |
| 2013/0298192 A1* | 11/2013 | Kumar | G06F 21/52 726/3 |

* cited by examiner

SYSTEM AND METHOD FOR SECURITY AND QUALITY ASSESSMENT OF WIRELESS ACCESS POINTS

RELATED APPLICATIONS

This application is a continuation of U.S. application Ser. No. 14/574,117, filed Dec. 17, 2014. U.S. application Ser. No. 14/574,117 claims benefits of U.S. Provisional Application Ser. No. 61/921,781 filed Dec. 30, 2013. The applications are hereby incorporated herein by reference in their entirety for all purposes.

FIELD OF THE INVENTION

The present invention relates generally to wireless computer networking techniques. More particularly, the invention provides methods and systems for security and quality assessment of Wireless Access Points used by wireless devices to communicate with remote servers over the computer networks.

BACKGROUND OF THE INVENTION

The proliferation of mobile wireless devices (smartphones, tablets, lightweight laptops) increases use of Wi-Fi networks outside of user's control. Connecting to an Access Point (AP) of the unsecure Wi-Fi network may expose user to different types of attacks: session hijacking, malware insertion, password interception, phishing for credentials, modifying information for misleading purposes (for instance, stock prices), etc. Using secure (HTTPS) sites only provides limited protection: attacker cam replace HTTP site's "Sign In" link, leading to a phishing site, intercept redirect from HTTP to HTTPS, or deduce HTTPS access pattern.

Due to these risks, users should avoid connecting to unsecure APs without additional protection. Virtual Private Network (VPN) usually provides sufficient protection for unsecure or untrusted connections by encrypting all traffic from the client through the router to the VPN server. In this way, neither other users on the same network or router software can see or modify client's traffic. However, VPN usually incurs performance penalty: path through the VPN server can be longer than direct route to the content provider.

Therefore, Wi-Fi users need information about security of available APs to decide on the best connection choices. Currently, the main source of this information is a security protocol announced by Wi-Fi hotspot: Wi-Fi networks without encryption ("public") or with weak encryption (WEP) are considered unsecure; networks with modern security protocols, such as WPA-PSK and WPA Enterprise, are usually considered secure.

However, announcement of a good security protocol does not guarantee user safety during connection to a specific AP. While some Wi-Fi routers can be compromised remotely, more attacks are possible when attacker is in physical proximity to the user. Some APs in user's communication range could be honeypots: APs with legitimate-looking names, set up to gather passwords or to modify traffic. If hotspot's password is weak, nearby attacker can discover it by using widely available software and join the network without authorization. Untrusted users on the same network can force reconnects and then decrypt network traffic, or use ARP cache poisoning to present their device as a gateway, becoming a man-in-the-middle, or detect and exploit router vulnerabilities. If user's computer is already infected with malware, such attacks can be executed without user's awareness.

There are some methods to detect possible attacks in presumably secure Wi-Fi hotspots, such as detection of a sudden gateway change that could indicate ARP attack. However, these methods are unreliable and can generate large number of false alarms: ARP records may change when user moves between different APs in a hotel; repeated reconnects can be caused by bad connection quality; honeypots may not present any known danger indicators.

AP or network gateway may protect users from some types of attacks by enforcing client isolation: each client is only allowed to communicate with the gateway, but not with other local clients. This method may be used only if local network doesn't have devices that require inter-client communications (printers, local storage etc.), and doesn't protect from honeypots. When available, client isolation isn't announced and therefore is not used to make a decision whether to deploy additional protection.

In addition to different risk profiles, different APs in the same communication range may have large differences in connection quality: for instance, one could support large data throughput through high-bandwidth ISP, while another offers much lower data throughput through a different ISP. Currently, there is no way to select the network with best connection quality, in particular larger bandwidth, before actually testing each connection from user's device.

Therefore, there is a need for a means to evaluate security and connection quality of wireless access point, especially ones that announce strong security protocols but have vulnerabilities that may expose their users to significant dangers or problems associated with low connection quality.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
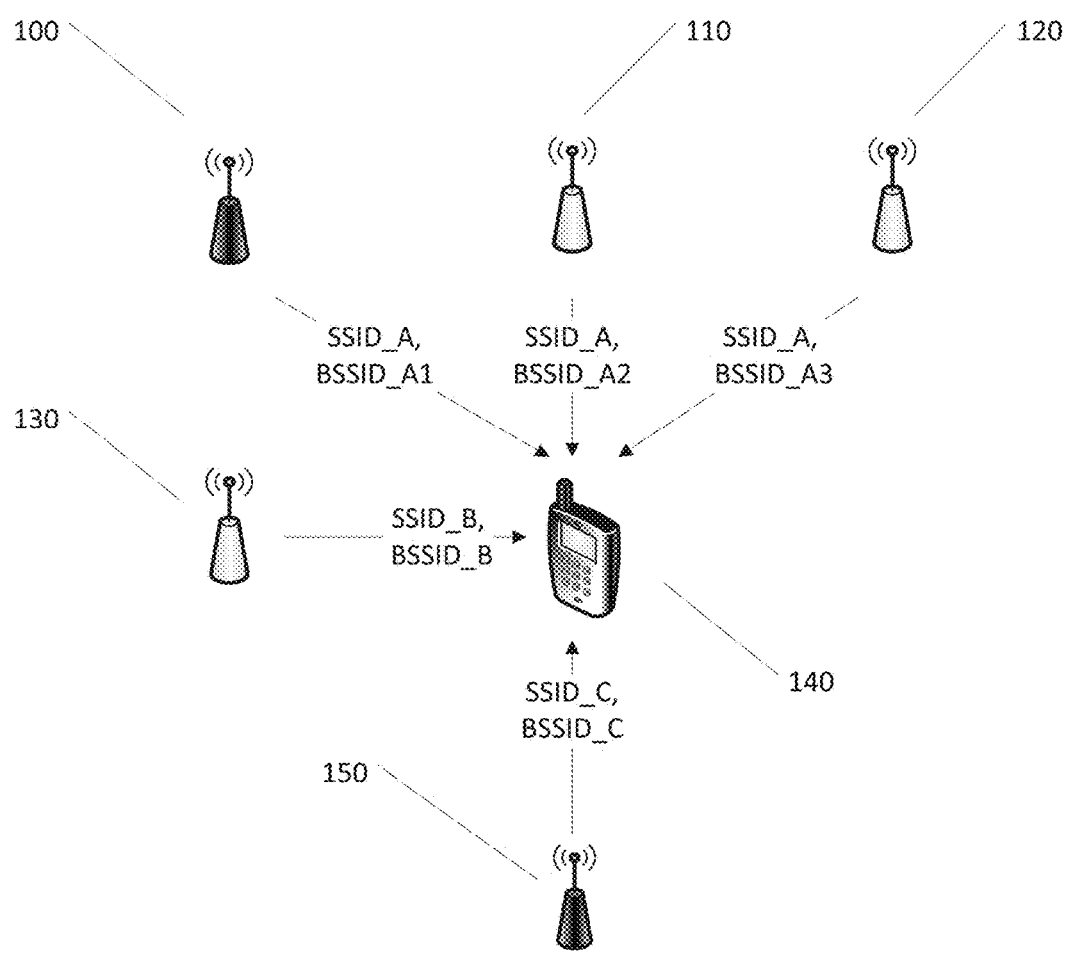
FIG. 1 is a schematic diagram of Wi-Fi access points with different levels of security risks according to the prior art.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows an example of mobile wireless device 140 receiving beacons from 5 access points (APs) in its communication range (100, 110, 120, 130, 150). Some APs broadcast the same Service Set Identifier (SSID), while using unique Basic Service Set Identifier (BSSID) for each AP.

In one or more embodiments, to provide reliable connections, no two independent (non-cooperating) APs may use the same BSSID within overlapping communication range; however, use of the same SSID by multiple APs with unique BSSIDs is allowed.

In the depicted example, APs 110 and 120 legitimately share the same SSID as member s of the same network (for instance, hotel's Wi-Fi network). However, AP 100 is an impostor: it broadcasts the same SSID, pretending to be a part of the same network, while creating unique BSSID to allow connections. If user is prompted to re-enter login credentials, attacker can use them to access the targeted Wi-Fi network, and then probe for local vulnerabilities or listen for traffic from other authenticated users.

AP 130 is a legitimate device from a different network: for instance, a nearby cafe, with different SSID. In one or more embodiments, AP 150 also has different SSID, but it is a "honey trap": user is lured to connect through it so that user's data could be analyzed or modified. Instead of creating new SSID and BSSID, AP 150 can use some well-known values of SSID and BSSID (for instance, copying the data from the existing AP of the popular cafe chain). As long as legitimate AP with the same BSSD is not in the communication range, user's mobile device 140 may automatically connect to AP 150, if SSID, BSSID and password where stored from the previous visit to legitimate AP used as a template to clone rogue AP 150 (attacker could have known the password in advance, for instance by spoofing a different BSSID earlier in the vicinity of the legitimate AP, similar to AP 100).

Prior art methods based on the history of visits from the user's device will not help to warn about AP 150 (it's a clone of legitimate AP that could be counted earlier), or may issue a warning about legitimate AP 110 (if it has different BSSID, not visited before by the same user), failing to distinguish it from impostor 100.

Prior art methods based on restricting access to predefined set of BSSIDs may also not help to identify AP 150 as a malicious clone. Also, users new to the area may not have advanced information about the list of legitimate BSSDs, such as APs 110, 120 and 130. In one embodiment, presented invention relies on reports from multiple users to identify APs with increased security risks.

Figure 2:
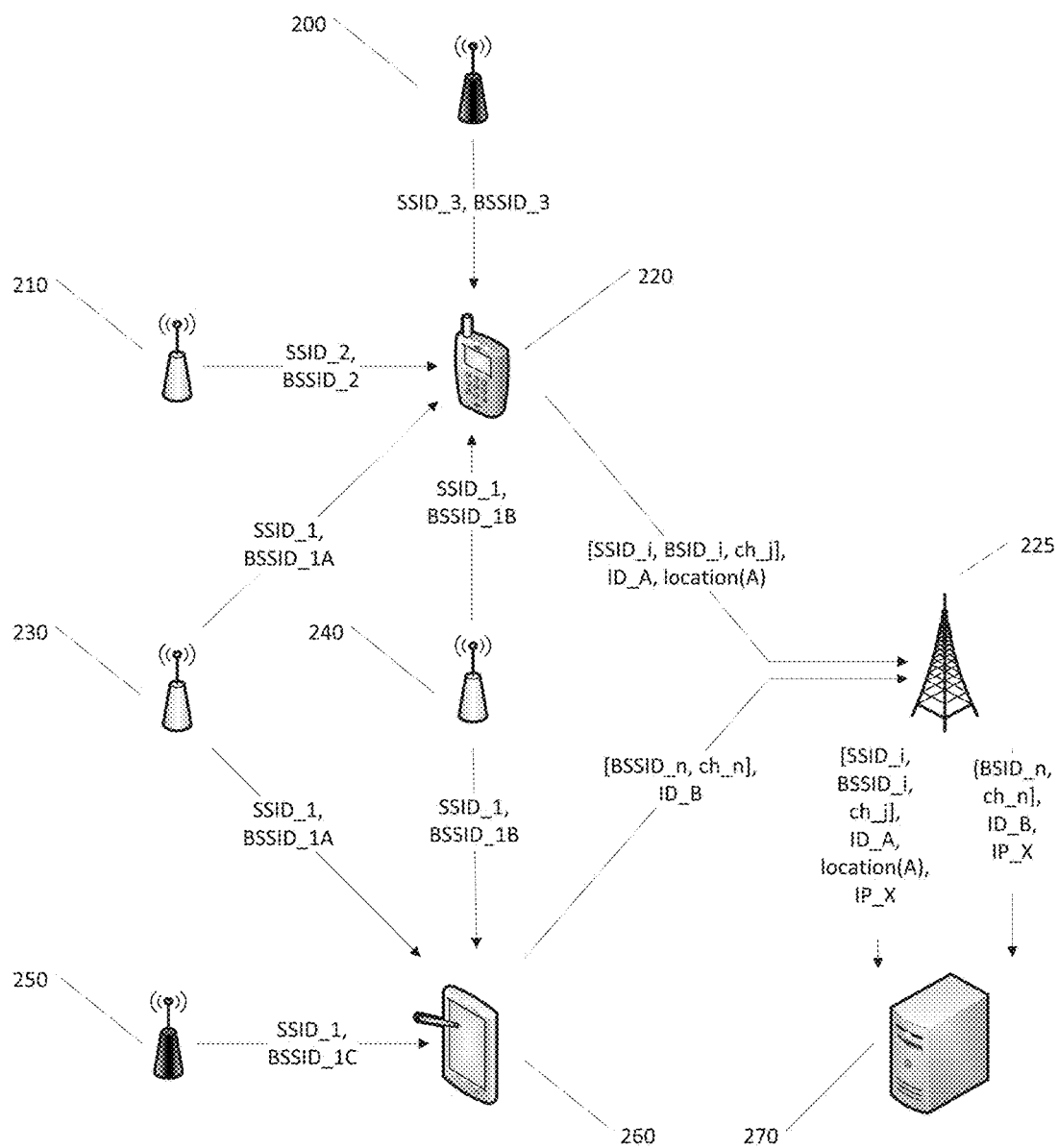
FIG. 2 is a schematic diagram illustrating Wi-Fi data collection and reporting before connection to an access point in accordance with an embodiment of the present invention.

FIG. 2 depicts an example of such embodiment; it combines depictions of data flows during 2 separate visits to the same location from users of 2 different mobile wireless devices: 220 and 260.

In one or more embodiments, device 220 detects beacons from APs 200, 210, 230 and 240. After determining SSID, BSSID and communication channel for each received beacon, device 220 sends a report containing this information through the cellular communication network, using nearby cellular tower 225. While sending the report, device 220 also includes its own ID (for instance, IMEI identifier or MAC address of its network card) and, if available, information about its location (for instance, obtained from the built-in GPS receiver). Report from device 220 is sent to a remote server 270, which stores reported data in a database.

In one or more embodiments, on a different day, the same location is visited by a different device 260, which detects beacons from APs 230, 240 and 250. It reports some of discovered data and its own ID to remote server 270, but doesn't add the information about its location (for instance, due to the lack of GPS device). However, remote server 270 does receive IP address of the cell tower 225 and, if it has access to appropriate look-up tables, can translate this IP address into an approximate location of device 260.

In one or more embodiments, reporting device should at least reference BSSID of the reported AP; other parameters of the AP are optional (BSSIDs of legitimate access points should be unique). In another embodiment, reporting device may reference another unique identifier of the AP (for instance, MAC address, if different from DSSID), or create a combined unique identifier from multiple parameters (for instance, hash of a combination of SSID and BSSID).

In depicted example, there are differences between Wi-Fi beacons received by different devices during different visits to the same location:

APs 200 and 210 are detected only by device 220
AP 250 is detected only by device 260.

One or more embodiments leverage the fact that legitimate APs are more persistent than malicious ones: increase of exposure time by malicious AP increases the risk of its discovery and potential traceability to the owner. Majority of malicious Aps may be available only intermittently, while legitimate APs may stay in the same place for a prolonged amount of time.

In the provided example, 2 of intermittent APs (200 and 250) are malicious, but 210 is a legitimate AP that's not broadcasting to device 260 for a benign reason: it could be new, or in the process of maintenance. Therefore, present example doesn't provide enough data to distinguish benign AP 210 from malicious APs 200 and 250; however, the fact that APs 230 and 240 are encountered on 2 visits from 2 different devices are used by the present invention to lower assessment of security risk associated with these APs, increasing probability that they are legitimate.

In the depicted example, reports are sent before any of the devices is connected to any access point, using an alternative communication channel (cellular network). In another embodiment, one or more reports could be postponed—for instance, stored on the user's device and then automatically sent when user later connects to another AP after changing location (for instance, connects to home Wi-Fi).

Figure 3:
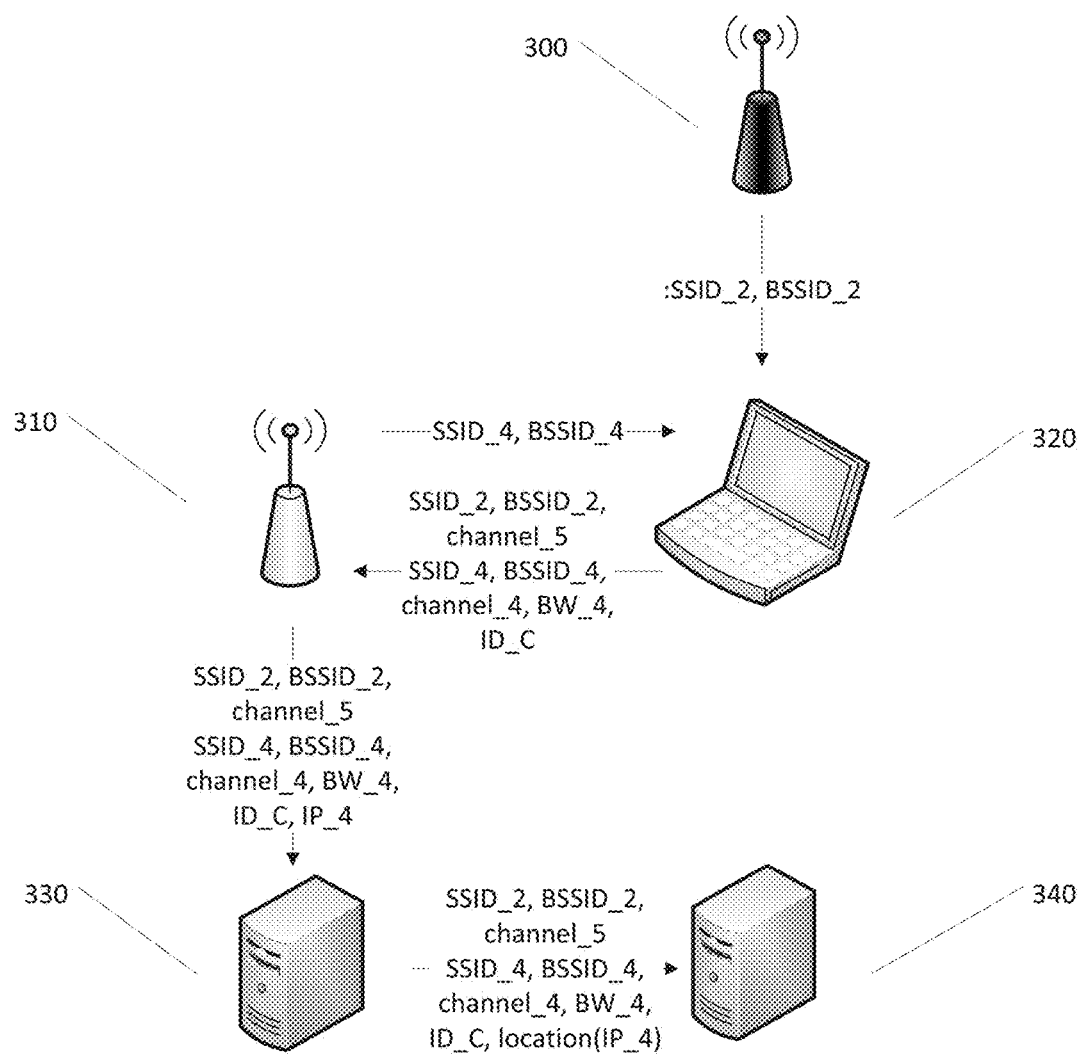
FIG. 3 is a schematic diagram illustrating data reporting after connection to the Wi-Fi access point in accordance with an embodiment of the present invention.

FIG. 3 depicts one other embodiment of the present invention, where reporting is sent after establishing a connection to a reported AP.

In this example, user's device 320 enters location different from one visited by devices 220 and 260 on FIG. 2, and detects beacons from APs 300 and 310. Device 320 determines parameters of received beacons, such as BSID, SSID and communication channel, and then proceeds to connect to one of the present APs (310). At that point, device 320 may not have any information about security or quality assessment of each AP, or ignore it, or use it to guide connection decision: for the purpose of this example, the relevant fact is that device 320 connects to AP 310 and uses this connection to send its report.

Note that in one or more embodiments, AP 300 in this example is a clone of AP 210 from FIG. 2: it has the same SSID and BSSID but is located outside of communication range of legitimate AP, so a connection to a clone AP could be successful. Device 320 just reports parameters of AP 300; assessment of its security risk is deferred until aggregated reports are analyzed, In one or more embodiments, the report is sent to a remote server 330, which in this example is connected to a separate database server 340. Remote server 330 may detect IP address of AP 310 and may use it to estimate approximate location of AP 310 and find ownership records of its IP address or other related information (AS number, assignment information, reputation of IP range from security organizations, etc.). This information, derived from an IP address, may be stored by the database server together with data reported by device 320.

In one or more embodiments, the database may store the same values as reported by the device, or some information derived from these values: for instance, SSID or channel data may be omitted; hash combining SSID and BSSID can be stored instead of or in addition to BSSID; IP range (with last octet masked) or hash of IP address can be stored instead of the exact IP; hash of user ID or partial ID can be stored for privacy reasons, etc. The only requirement for database storage according to the present invention is to be able to identify previously visited APs and extract related information in response to a request containing one or more identifiers derived from data supplied by evaluated APs.

In the depicted embodiment, device 320 also reports connection quality parameters associated with AP 310, in particular data bandwidth, To do that, device 320 may send a request for one or more data files stored at a known location, for instance at remote server 330. Time it takes to receive these files, or it derivatives, can be used to measure the latency and/or throughput of AP 310. If files of different sizes are requested, latency and throughput parameters can be separated and averaged across multiple attempts.

In other embodiments, a device may monitor and report other important characteristics of the AP, related both to potential security risk and communication quality: number of reconnects (could be due to a weak signal, or to deliberate attacks), beacon rates, QoS parameters (for instance, differences in data rates for different types of content, such as HTTP vs. torrent traffic), access restrictions (for instance, inability to access specific ports, IP addresses or domains). In some other embodiments, mobile device may monitor and report parameters of traffic originated from other users connected to the same network, or events caused by such traffic. For instance, if monitoring program has a "root" (administrative) privileges and can access kernel-level information about data packets, it can monitor traffic from other devices with non-routable IP addresses (which indicate their presence on the local network). Such program could extract number of packets of different types (ARP, SSDP, etc.), lists of unique local IPs and the total number of such IPs that could be identified as other users on the same network (for instance, non-routable IPs not listed as gateway, DHCP or DNS server). Detection of such users, even without any indication of malicious activity, signifies a potential security problem with AP or the network gateway: lack of "client isolation". This feature, when enabled, prevents local network users from talking to each other and listening to each other traffic. It is usually disabled in trusted and controlled environments (for instance, to communicate with wireless printers at home or in the office), but may present a vulnerability for networks accessed by large number of untrusted users (for instance, visitors to a cafe sharing the same Wi-Fi password).

In one or more embodiments, even if monitoring program doesn't have root access, some devices allow monitoring of the entries stored in ARP cache, such as an IP address of a gateway. Change of such address during the session could indicate a successful ARP cache poisoning attack, or could be a benign result for changing from one legitimate AP to another. An embodiment of the present invention may report such event or other information derived from the observed local traffic, while deferring the security risk assessment until data from multiple visits are aggregated and analyzed.

Figure 5:
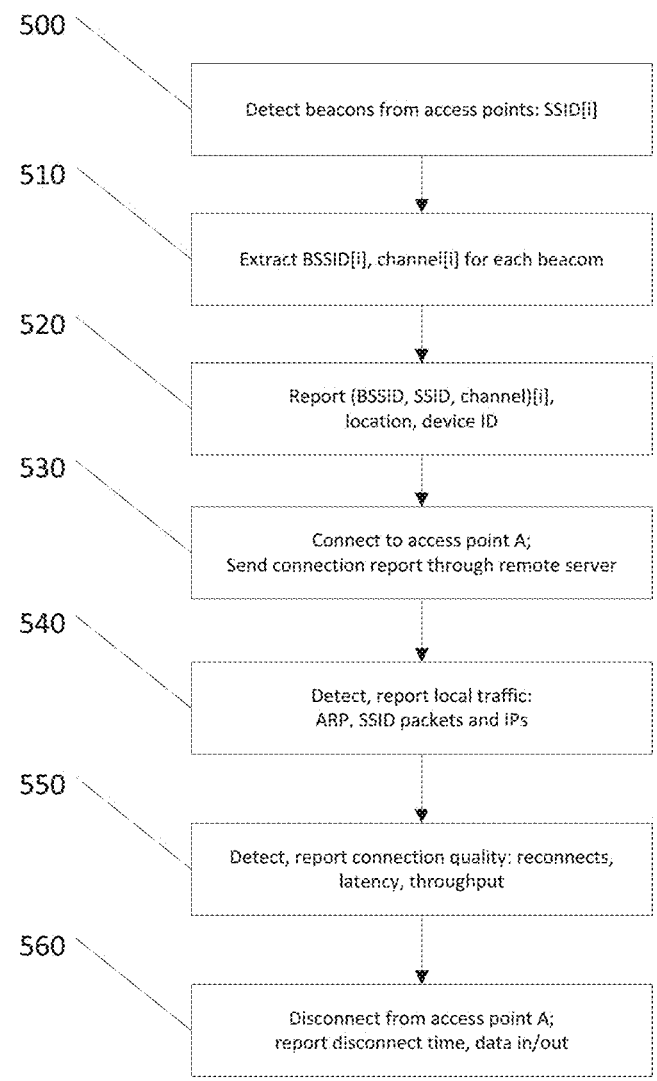
FIG. 5 is a process flow diagram of a method for Wi-Fi monitoring and reporting in accordance with an embodiment of the present invention.
Figure 6:
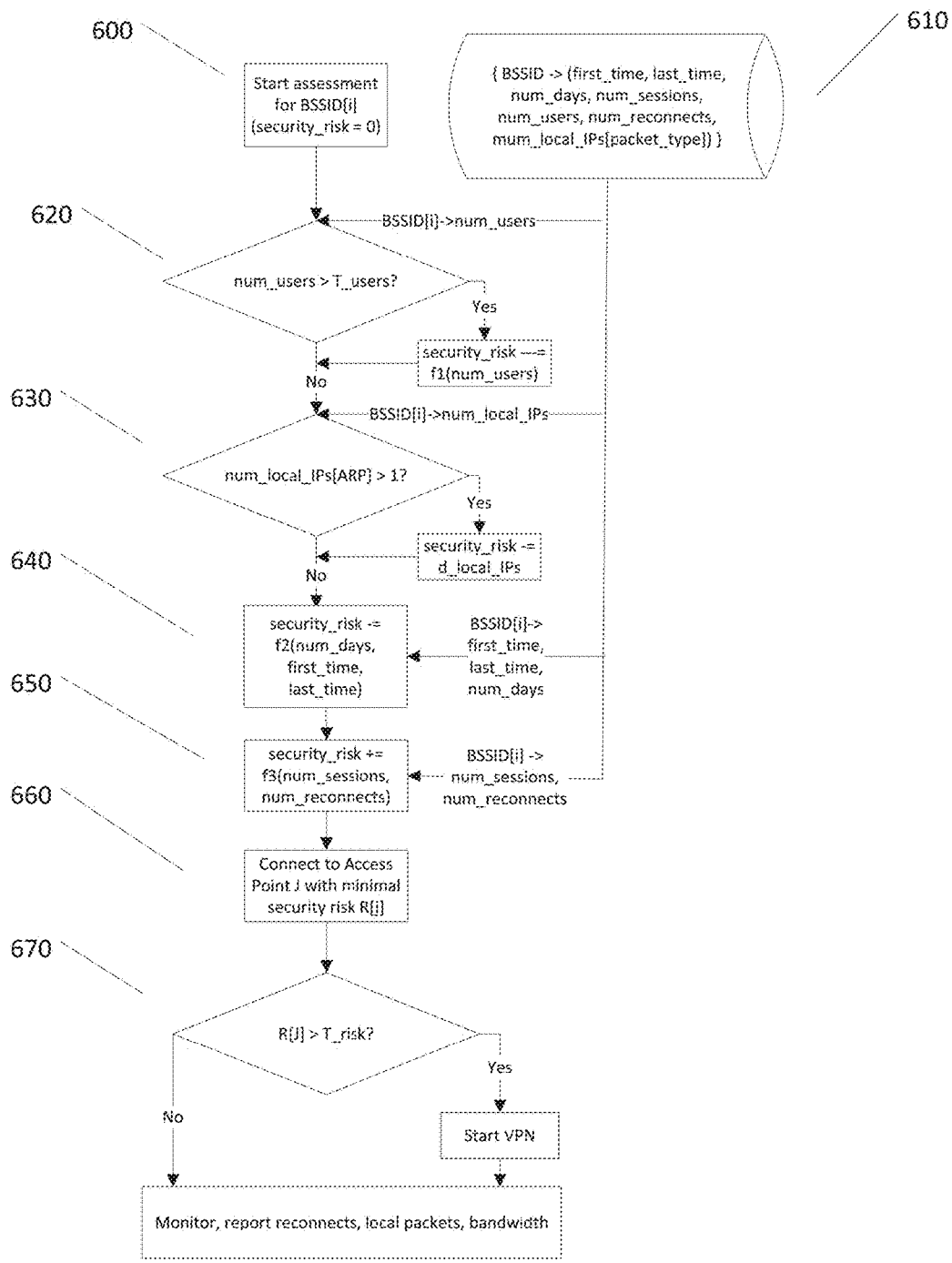
FIG. 6 is a process flow diagram of a method for security and quality assessment of Wi-Fi access point from characteristics obtained during multiple visits in accordance with an embodiment of the present invention.

In one or more embodiments, as described in reference to FIGS. 5 and 6, such analysis could include comparing data from multiple users visiting APs with the same identifiers, or comparing multiple characteristics of such APs visited by the same or different users.

Figure 4:
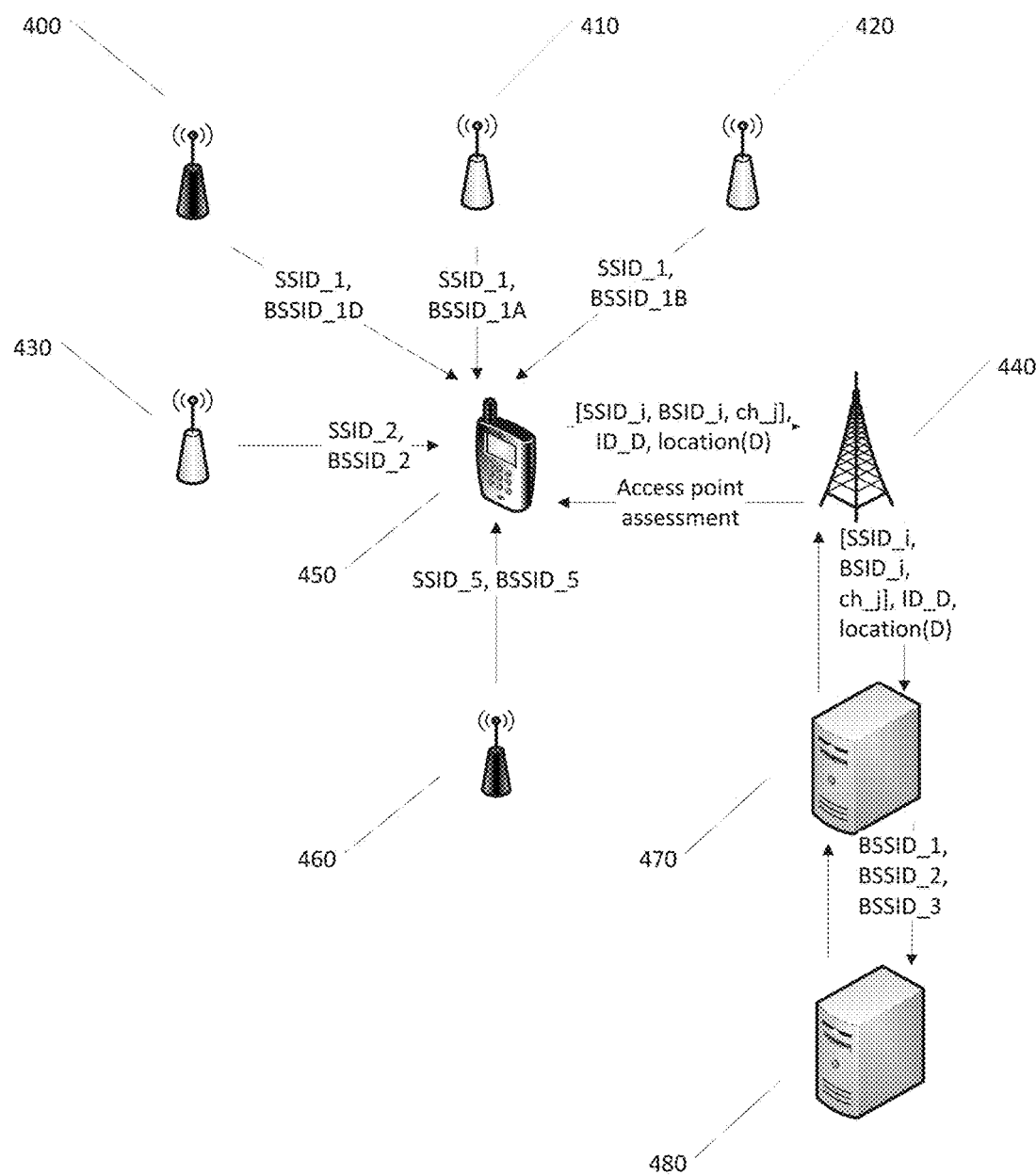
FIG. 4 is a schematic diagram illustrating data flow during security and quality assessment of Wi-Fi access points in accordance with an embodiment of the present invention.

FIG. 4 depicts an example of data flow during security and quality assessment of Wi-Fi access points.

In the depicted example, mobile wireless device 450 enters the same location as devices 140 (FIG. 1), 220 and 260 (FIG. 2). During this visit, it detects beacons from APs 400, 410, 420, 430 and 460, extracts at least one unique identifier (such as BSSID) from each received and this information with a request for a security assessment of the detected APs.

In the depicted embodiment, this request is sent before device is connected to any of the present APs, by using nearby cellular communication tower to connect to a remoter server 470. In other embodiment's, request for security assessment could be sent after device connects to any of the detected access points (with an intention to reconnect to another one if current AP has high security risk). In some other embodiments, mobile device may postpone request for a security assessment until connecting to a trusted AP (for instance, at home), and then store security risk assessment for future visits.

In the depicted embodiment, remote server 470 accepts request for a security risk assessment and then sends a query to a database server 480 to get information stored for a set of unique identifiers of evaluated APs (for instance, BSSIDs).

Figure 7:
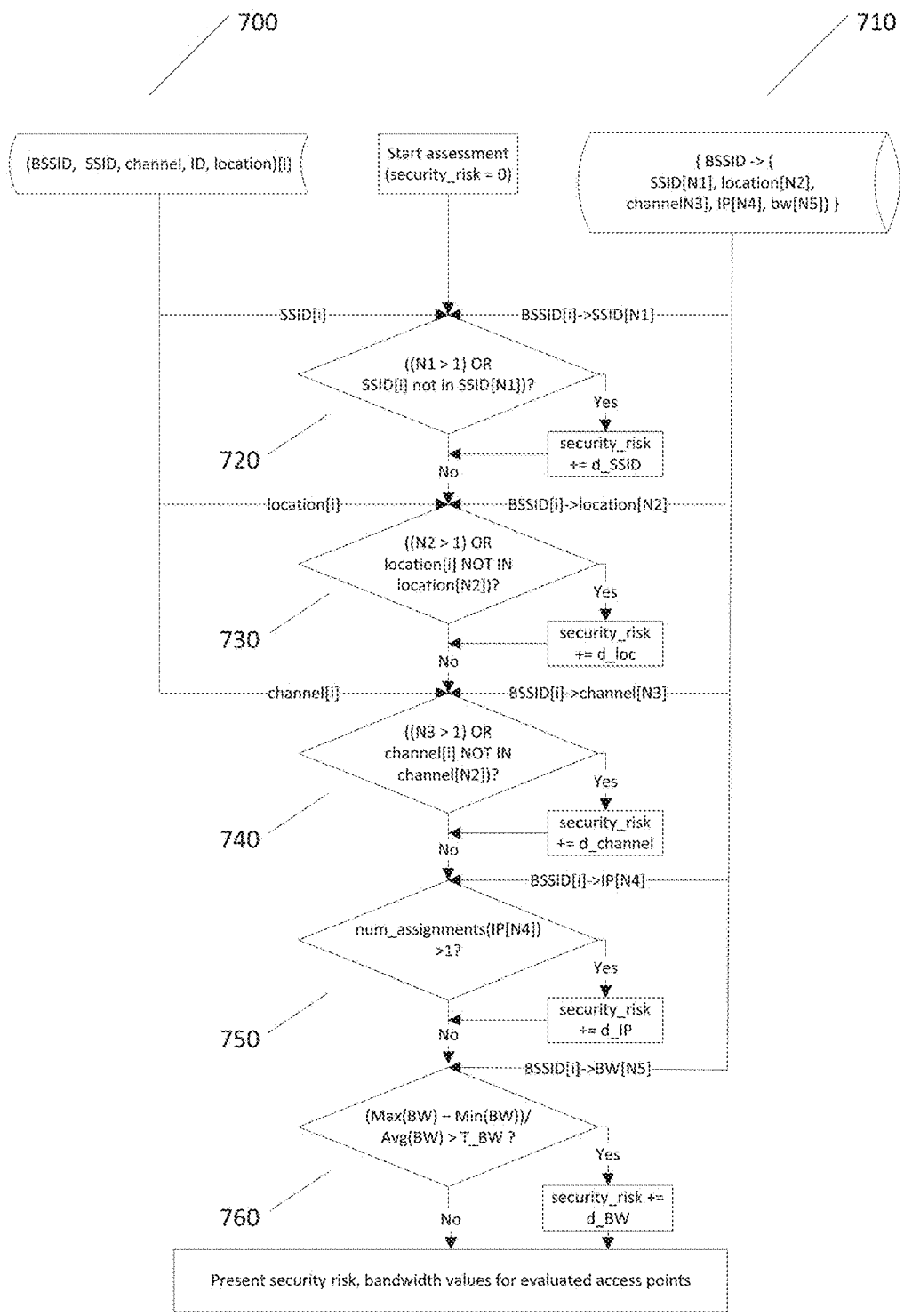
FIG. 7 is a process flow diagram of a method for Security and quality assessment of Wi-Fi access point from characteristics obtained during multiple visits in accordance with an embodiment of the present invention.

In one or more embodiments, after receiving results of the query, server 470 generates security risk assessments further discussed in reference to FIGS. 6 and 7, and then returns such assessments to requesting device. In the depicted example, rogue access point 400 has higher security risk than its legitimate neighbors 410 and 420 (BSSID of AP 400 wasn't encountered before, while BSSIDs of APs 410 and 420 remained unchanged during visits from multiple mobile devices). AP 430 has higher security risk because AP with the same identifiers was reported from a different location (AP 300, FIG. 3).

In one embodiment, device 450 will refrain from connecting to AP 430 even it is a legitimate AP whose security risk is elevated due to malicious cloning attempt. In another embodiment AP 450 could be recognized as legitimate if it's reported from current location multiple times by multiple users within large time interval, while its clone has much smaller number of reported occurrences in different locations.

In one or more embodiments, AP 460 is also associated with higher security risk: in this example its BSSID was never seen before. FIG. 1 depicts temporary appearance of the "honey trap" AP 150; AP 460 in FIG. 4 could be another rogue AP, or just a new legitimate AP; accordingly to the present invention, its security risk will remain relatively high until its persistence is confirmed by multiple reports.

In some other embodiments, remote server and the database server could be combined. In one such embodiment, where security risk is evaluated by comparing secondary characteristics of evaluated AP such as its stored locations, both reported data storage and assessment of security risk for evaluated APs could be performed on the same mobile device, without issuing outside requests.

FIG. 5 depicts one embodiment of Wi-Fi monitoring and reporting steps.

Wi-Fi data collection and reporting occurs before connection to reported AP. It starts with detection of the beacon from one more APs, broadcasting their SSIDs (step 500).

In one or more embodiments, because SSID doesn't uniquely identify an AP, extraction of unique identifier (for instance, BSSID) from the beacon's packets is performed after detecting a beacon (step 510). In other embodiments, MAC address could be extracted if different from BSSID. Alternatively, determination of unique AP identifier can be performed after user connects to an AP. At the same step, device may also determine channel number, for instance by detecting that signal communication frequency is within one of the known ranges. In one or more embodiments, mobile device reports parameters of the AP together with its own data at the step 520 (location, if available from operating system or built-in GPS device) and it's own identifier (for instance, hash of the IMEI or of the MAC address of its network card). In this example, device then connects to an AP (step 530), and then sends a report to a remote server confirming that connection has occurred (connection session started). In other embodiments, this step can be skipped or combined with report from the step 520. In one or more embodiments, while being connected, mobile device may continue to monitor local traffic (step 540), detecting, for instance, whether AP or gateway supports client isolation and, if not, how many local devices are currently active on the same network. These finding could be reported immediately, especially if potentially unsecured event such as a change of gateway IP is detected, or their reporting can be deferred until the next steps. In the depicted embodiment, mobile device also performs a combination of active and passive monitoring to determine connection quality (step 550): for instance, it detects de-authorization requests and reconnects, estimates available bandwidth, observes whether network providing the AP throttles some types of traffic (for instance, torrents) or blocks access to some ports or protocol. Data throughput and latency can be measured actively (by issuing one or more requests to remote servers for files of different sizes) or passively (by observing existing data traffic within specific time frames). In one or more embodiments, reporting of the connection quality parameters can be performed at the step 550, or deferred to a later time. In one or more embodiments, end of connection session (step 560) may also cause separate reporting; in other embodiments, all or some reports can be accumulated and reported as a batch covering multiple visits to different groups of APs.

FIG. 6 depicts one embodiment of a process of obtaining security assessment of Wi-Fi AP from reports by multiple users. As depicted on FIG. 4, mobile device sends a request for security assessment of identified APs; FIG. 6 depicts an example of the steps performed to generate such an assessment. In one or more embodiments, process starts at the step 600 by assuming default value of security risk (0) for evaluated access point BSSID[i].

In one or more embodiments, database 610, containing aggregated results of previous reports, is queried for information related to BSSID[i]. In the depicted representation, database 610 stores this information as a hash array with BSSID as a key, and a set of aggregated parameters as a value (times of the first and last reports, number of days when reports were received, number of communication sessions, number of distinct users, number of reconnects, number of distinct local IPs per packet type (ARP, SSDP, Other), detected for APs that don't support client isolation. Database itself could be a relational database supporting SQL queries (Postgres, MySQL, etc.), or "no SQL" database such as MongoDB, or a simple hash array stored in memory and referenced by hash keys.

FIG. 6 depicts the case where record for evaluated BSSID is found in the database 610. If no such record is found, security risk is immediately set to a predefined value indicating unknown AP (usually high enough to discourage user from connecting if more secure options are available or at least recommending to use additional protection such as VPN).

In one or more embodiments, step 620 adjusts security risk based on the number of unique users (num_users) who've visited evaluated AP. In depicted embodiment, security risk decreases when num_users exceeds pre-defined threshold (for instance, set to a value between 2 and 10). When number of reporting users grows above 1 (and, possibly, changes from day to day), it may indicate that evaluated AP is used for public access by potentially untrusted users (for instance, a cafe); small number of users, unchanging from one day to another, may indicate private AP accessed by trusted users (for instance, home office). Public AP may be considered less secure, so initial growth of num_users may increase assessed security risk. However, further growth of num_users, for instance after num_users becomes larger than threshold T_users, may decrease security risk: large number of unique users connecting to the same AP confirm its persistence, distinguishing it from short-lived malicious APs. In the depicted embodiment, such decrease of security risk is computed as a function f1(num_users). This function could be non-linear (for instance, stop changing or reversing direction if number of users grows too much), or depend on multiple parameters (for instance, use timing as an input argument together with number of users). The main distinguishing feature of depicted embodiment is a dependence of assessed security risk on the number of unique users sending reports about evaluated AP, with exact nature of such dependency differing for different embodiments.

In one or more embodiments, step 630 adjusts security risk for APs without client isolation, where reporting device can detect other users on the same local network. For instance, if any number of distinct local IPs associated with ARP packets is detected, it security risk is increased by a pre-defined value d_local_IPs. In another embodiment, security risk may further increase with growth of the number of distinct local IPs, of with the number of packets sent by local users (for instance, large number of ARP packets from the same local IP may indicate an ARP flood attack).

In one or more embodiments, step 640 depicts adjustment of security risk based on the timing information: dates of the first and last access and total number of days. In the depicted embodiment, increase in the covered time period and access days confirms persistence of the AP, decreasing its security risk. Function f2, specifying degree of such decrease, could be non-linear (for instance, taking into account only recent visits), or even reverse direction (for instance, if recent visits change sharply in comparison with running average). In other embodiments, this function could depend on one or more additional parameters, for instance, taking into account behavioral patterns of unique users.

In one or more embodiments, step 650 adjusts security risk based on the number of detected reconnects. Reconnects could be caused by relatively benign reasons (low signal quality, noisy environment etc.) or by deliberate attacks (for, instance, de-authorization requests used to capture reconnection frames to detect encryption key, or to switch user to a different AP). In depicted embodiment, function f3 evaluates number of reconnects per session and increases security risk when this ratio becomes large. In other embodiments, security risk could be increased in response to temporary spikes in the number of reconnects, even if their average number remains much lower than the number of connection sessions. In some other embodiments, number of reconnects could also be used to evaluate connection quality: user may be advised to avoid using AP with relatively large frequency of reconnects, even if such AP has low security risk.

While depicted embodiment shows a particular sequence of security risk adjustments, different embodiment s may use a different order of such steps, or perform multiple steps in parallel, or skip some of the steps, or merge different steps within a multi-argument function. In one or more embodiments, after security risk assessment of evaluated access points is generated, it can be used to assist in establishing Wi-Fi connection with best balance between security and access quality. For instance, at the step 660 mobile device is instructed to connect to the AP with minimal security risk R[j]. At the step 670, this risk is compared with a threshold for safe unprotected access (T_risk). If minimal risk R[j] is larger than T_risk, mobile device is instructed to use Virtual Private Network (VPN) while being connected through recommended AP. VPN will encrypt all traffic between the mobile device and remote VPN server, making it very difficult for the attacker to analyze or change user's data. However, VPN may decrease overall connection performance (increased latency, additional encryption overhead, etc.) and therefore should be used only when really needed to improve access security.

In other embodiments, information about security risk assessments could be presented to the user without causing automated connection, or employ different means of protecting connections with elevated security risk. For instance, VPN could be selectively used only to protect unencrypted data (protect HTTP data, while sending HTTPS data in bypass of VPN), or protecting only selected domains (for instance, access shopping or health sites through VPN, while accessing generic news sites without VPN). In some other embodiments, mobile device could deploy different protection measures when accessing APs with elevated security risk: for instance, if root access is available, local firewall on users device could block traffic between current user and other users on the same local network, effectively enforcing client isolation even if current AP or gateway doesn't support it. That could decrease assessed security risk to a level below the threshold for VPN use, but may block access to other devices on the same network (such as wireless printers), unless they are deliberately excluded from being blocked.

In one or more embodiments, after user is connected to selected AP, with or without additional protection, mobile device can continue to monitor and report events such as reconnects, local packets and bandwidth; security risk could remain the same for connection session, or continue to be adjusted depending on detected events. For instance, detection of large number of reconnects or new local users could cause internal re-computation of security risk, even if no addition request is sent to the remote server; if risk becomes higher than the threshold, mobile device could turn the VPN On, or disconnect and try another AP.

Embodiment depicted on FIG. 6 relies on reports rom multiple users to evaluate persistence of the AP and distinguish it from the short-lived rogue APs.

FIG. 7 depicts an embodiment where security and quality of Wi-Fi AP can be accessed by monitoring its secondary characteristics during multiple visits, even if such visits are performed by the same user.

In this embodiment, request for AP assessment 700 contains multiple values in addition to BSSID, such as SSID, communication channel and location of the mobile device. These values are compared with the data stored in the database 710. In the depicted embodiment, stored data contain arrays of distinct locations, channels, public IPs and bandwidth values reported for AP with particular BSSID.

In one or more embodiments, subsequent processing steps increase security risk assessment if stored characteristics change from one visit to another, even if such visits are performed by the same user.

For instance, at the step 720 security risk increases by d_SSID if AP has changed its SSID (number of different SSIDs in the database is more than 1, or new SSID is submitted with the assessment request). APs with stable SSID are considered more persistent and therefore are associated with lower security risk. In another embodiment, AP security risk may depend on the count and timing of SSIDs reports: for instance, if latest SSID was reported during multiple recent sessions while remaining unchanged, security risk could remain low.

In one or more embodiments, similarly, step 730 increases security risk for AP with multiple stored locations, or a new location. Location change could be a strong indicator of maliciously cloned AP, such as AP 300 on FIG. 3. In other embodiments, AP security risk may depend on the count and timing of location reports: for instance, if latest location was reported during multiple recent sessions while remaining unchanged, security risk could remain low.

In one or more embodiments, at the step 740, security risk can be adjusted based on reported channels. While channel change is usually benign (different channels could be used to avoid interference with other users or sources of radio noise), channel switch could be used by an attacker to force user's connection to an AP with a stronger signal. In some embodiments, penalty for channel change (d_channel) could be relatively low, or be imposed only if number of channel switches spikes above threshold during a particular time period.

In one or more embodiments, step 740 depicts increase of the security risk if there is a change of one or more characteristics associated with public IP address of the evaluated AP. In addition to geo location, range of routable IP addresses can be associated with known owner (for instance, ISP or an organization), AS number (used for BGP advertisement), assignment (indication of temporarily ownership transfer), assigning authority etc. If rogue AP uses its own communication channels to connect to the Internet (for instance, cellular hotspot), the change in IP address ownership would allow to detect it even if it perfectly clones SSID and BSSID of legitimate AP, shuts legitimate AP down by issuing a flood of de-authorization requests and then presents itself in the same location.

In one or more embodiments, step 760 depicts use of bandwidth information collected during active or passive tests to detect security risks associated with "man-in-the-middle" attacks. If attacker succeeds in replacing IP of the gateway with its own in the user's ARP cache, user's traffic is re-directed through the attacker's device before reaching the real gateway. This could be detected by the drop of the available bandwidth, especially if attacker deploys deep packet inspection that slows data transfer. In the depicted embodiment, security risk is increased if range of detected bandwidth values, normalized by the average value, becomes larger than threshold (for instance, 2 . . . 5). In other embodiments, security risk could increase only if large variation of available bandwidth is detected within the same session, or in conjunction with the change of gateway IP, or only for AP without client isolation.

In some other embodiments, bandwidth data could be used only to assess connection quality, without any change in security risk.

While depicted embodiment shows a particular sequence of security risk adjustments, different embodiment s may use a different order of such steps, or perform multiple steps in parallel, or skip some of the steps, or merge different steps in a multi-argument function.

In one or more embodiments, after security risk assessment of evaluated access points is generated, it can be used to assist in establishing Wi-Fi connection with best balance between security and access quality, to deploy additional protection measures such as VPN or just to present information about security or access quality of evaluated APs to the user.

Figure 8:
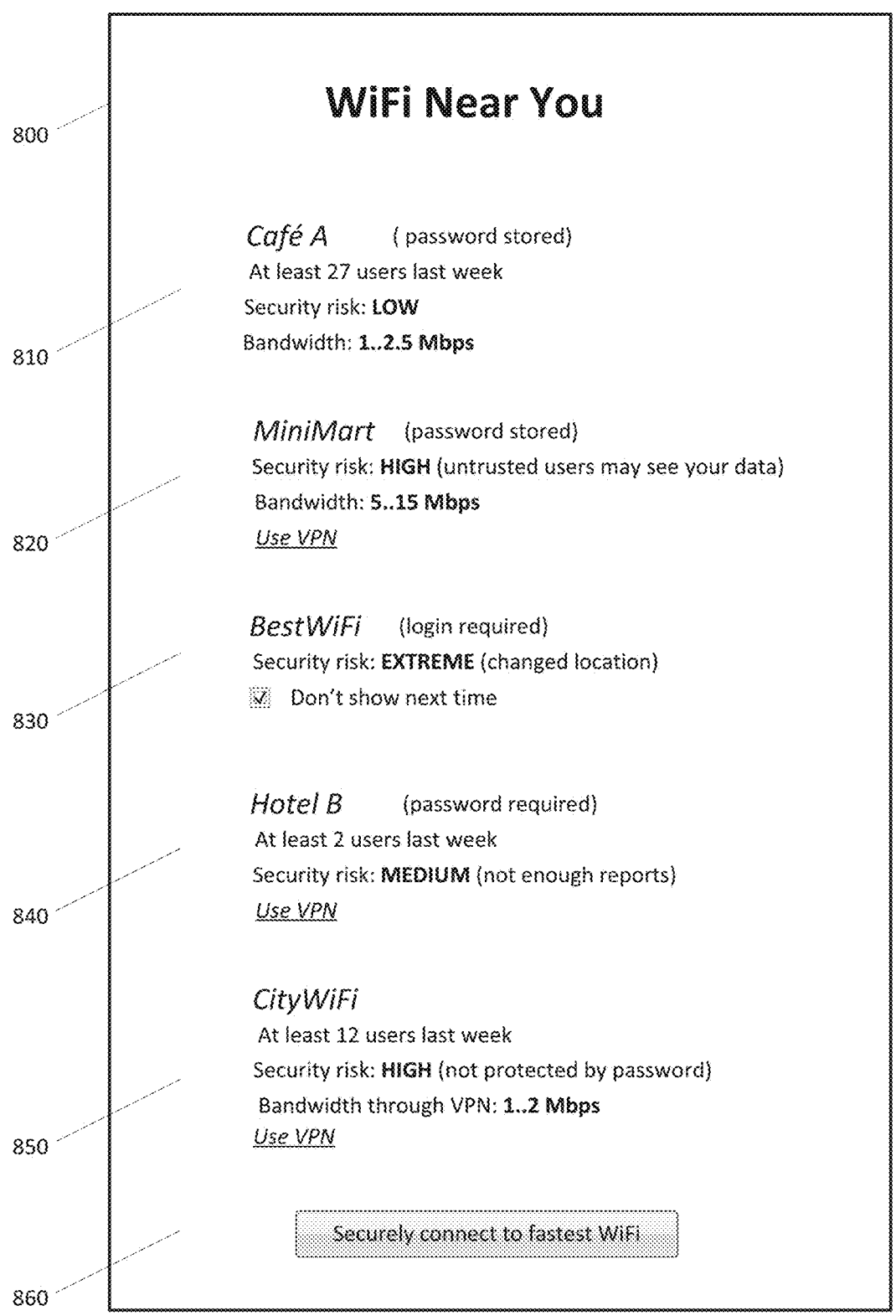
FIG. 8 is a process flow diagram of a method for presenting security and quality assessment of Wi-Fi access points in accordance with an embodiment of the present invention.

FIG. 8 depicts an example of the User Interface for an application (for instance, Wi-Fi Finder application for a mobile device) or a web site used to show the information about evaluated APs near the user's location.

In one or more embodiments, after user enters particular location and opens the Wi-Fi Finder application or a corresponding web site, information window 800 displays results of evaluating nearby APs. Such APs could be detected by their beacons before or after an application or web site is opened; it could be done before or after user has connected to a specific AP; assessment results could be either received from remote server or read from local storage.

The main goal of the described embodiment is to enable informed decision by the user which AP to use for best security and/or connection quality, especially if user is in the unknown location.

In the described embodiment, name (SSID) of each detected AP is listed together with additional information obtained during the assessment.

In one or more embodiments, record 810 depicts a persistent, low-risk AP, confirmed by significant number of users during the stated period, with stated range of available bandwidth. Notice that password is stored indicates that AP uses secure encryption, was visited before by the current device and wouldn't require user to manually re-enter the password.

In one or more embodiments, record 820 depicts AP with potential security problem: presence of the traffic from other local users was detected during a visit by a different device, indicating that AP or its gateway doesn't support client isolation. It has higher available bandwidth, and some users could prefer it over others. To decrease security risk, user is recommended to enable VPN while connecting to this AP.

In one or more embodiments, record 830 depicts AP with extreme security risk: its location has changed recently, which may indicate cloned impostor. "Login required" notice indicates that this AP deploys "Wi-Fi Enterprise" authorization, which assigns each user a specific password instead of sharing the same password between multiple users, such as WPA-PSK. While considered more secure, this authentication method may also be used to trick users into entering their login credentials, allowing attackers to later impersonate such users on legitimate networks. No bandwidth data is shown, because no device has connected to that AP after location change. User is offered a choice to hide this AP from the UI, to decrease a chance of accidental connection.

In one or more embodiments, record 840 depicts AP with relatively small number of records in the database: not enough to make a judgment about persistency if AP's characteristics. Use of VPN is recommended when connecting to this AP, even if it also requires a password and has relatively strong encryption (for instance, WPA-PSK).

In one or more embodiments, record 850 depicts public AP without encryption (no password required). While it's considered persistent (reported as unchanged by the large number of users), its security risk is assessed as "High", because even users not connected to that AP can passively monitor all unencrypted traffic. Use of VPN is also recommended, at least for HTTP traffic.

Prior art AP assessment methods would only recommend increased security protection for the AP depicted in the record 850, due to its lack of encryption. As depicted in FIG. 8, embodiments of the invention identifies multiple APs as having elevated security risks even if they employ relatively secure encryption algorithms such as a WPA-PSK or WPA Enterprise.

Other embodiments may present different types of data to the user: for instance, show security risk without providing connection quality or bandwidth data; show only connection quality data without displaying the level of security risk (for instance, if all unsecure entries are hidden); different types of data could be shown for different APs or to different users (for instance, as controlled by custom settings).

In one or more embodiments, in addition to presenting AP assessment data, depicted embodiment offers an easy choice to automatically connect to the fastest AP without compromising user's security (button 860). For instance, click on this button could initiate a connection to AP 820 (having fastest bandwidth), while using VPN for increased security. If additional tests show bandwidth drop due to VPN use, user could be automatically reconnected to safer AP 810 that doesn't require VPN.

In other embodiments, the balance between security and speed for automatic connection can be customized by the user; display of AP assessment data could be triggered only in cases when user input is preferred to making an automated choice (for instance, only in the new locations, of when set of APs detected in the already visited location has changed).

While depicted embodiments refer to Wi-Fi access points, present invention is also applicable to any local networks that could be differentiated by their identifiers. For instance, security risk or connection quality assessment according to present invention could be issued for wired (LAN) connections provided to guests in different hotels; for local Wi-Fi hotspots supported by cellular communication networks; for wireless networks covering relatively large areas (such as WiMAX, satellite-based connections or fixed-bandwidth connections). Even if evaluated network doesn't provide an explicit identifier, such as BSSID, present invention could be used if unique identifier could be obtained for evaluated network (for instance, MAC address of the modem or gateway). For example, shared wired network (LAN) could be considered relatively secure if MAC address and IP of its gateway remain unchanged, bandwidth remains within limits reported by previous users and there is no detectable traffic from other local users.

While depicted embodiments refer to mobile wireless devices, present invention is also applicable to any devices connected to a communication network, even if they don't have wireless capability. As described above, present invention can be used to assess the security risk of the wired network (LAN), used by devices without wireless network cards.

In one or more embodiments, data used to report and evaluate persistence of APs and other local networks is not limited by the depicted embodiments; it may also include such parameters as malware detection events, libraries and OS versions installed on APs or routers, make and model of APs or routers, results of external or internal penetration tests, etc.). For instance, if multiple devices connected to the same AP report detection of similar malware events (for instance, access to the same IP range of command-and-control centers of the bot network), it could be an indicator of elevated security risk; if frequency of malware events for the same device connected to the same AP increases during repeated visits to this AP, while remaining low for other APs, it could also indicate elevated security risk.

In one or more embodiments, information about connection quality could be accumulated from different reports and then used to assist in selecting the best connection. Such information isn't limited to the depicted examples; it may also, contain, for instance, measurements of ping tests; results of trace route analysis, measurements of packet losses, measurements of the size of congestion window or other traffic congestion indicators, etc. Connection quality could also be rated differently based on the types of processed data: for instance, short latency is more important for the web content; higher throughput is more important for videos; combination of both is important for games with real-time network interactions.

Figure 9:
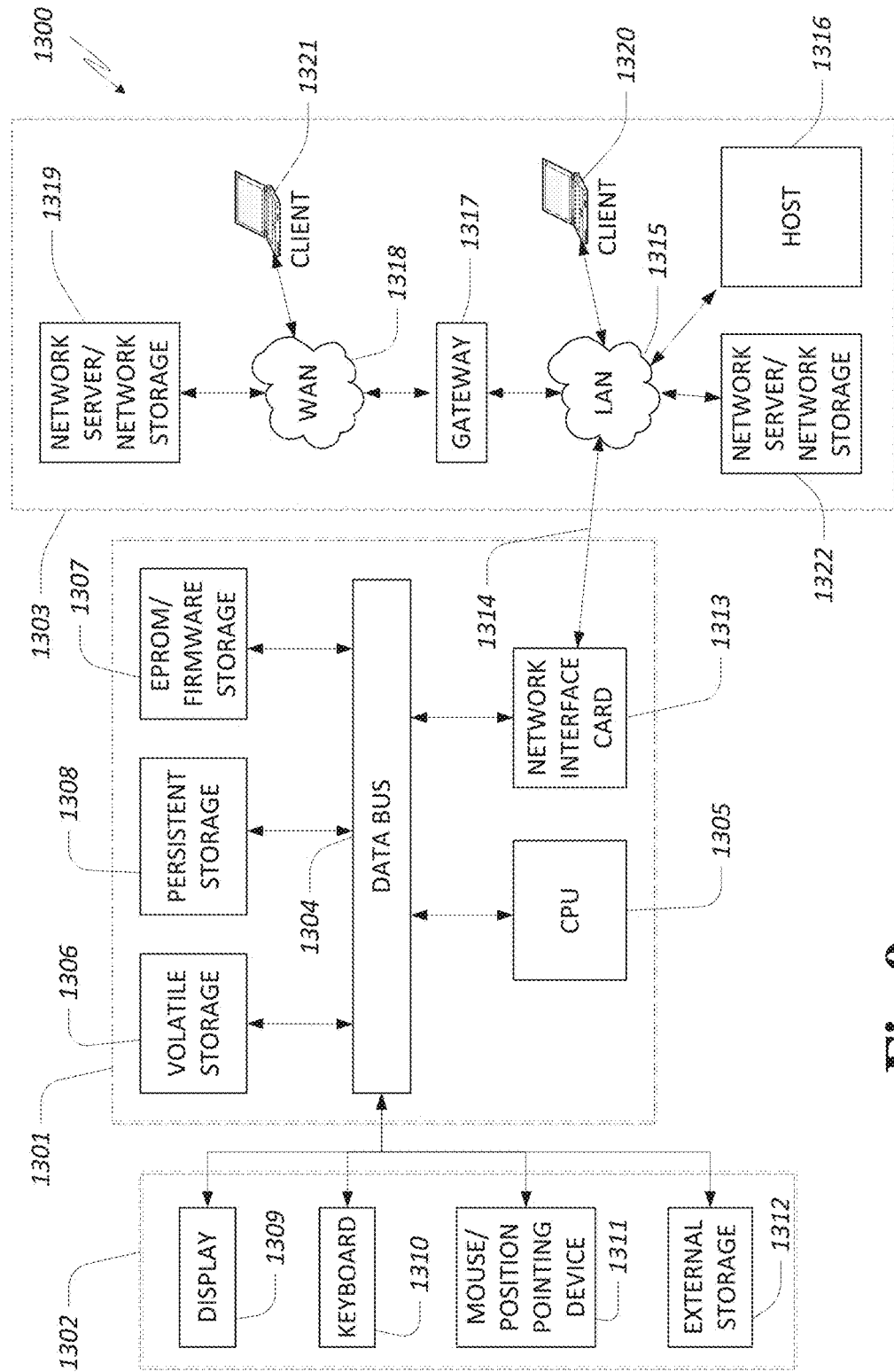
FIG. 9 is a schematic diagram of a computerized system upon which the implementations disclosed herein may be deployed.

FIG. 9 illustrates an exemplary embodiment of a computer platform upon which various embodiments of inventive system and method may be implemented. Specifically, FIG. 9 represents a block diagram that illustrates an embodiment of a computer/server system 1300 upon which an embodiment of the inventive methodology may be implemented. The system 1300 includes a computer/server platform 1301, peripheral devices 1302 and network resources 1303.

In one or more embodiments, the computer platform 1301 may include a data bus 1304 or other communication mechanism for communicating information across and among various parts of the computer platform 1301, and a processor 1305 coupled with bus 1304 for processing information and performing other computational and control tasks. Computer platform 1301 also includes a volatile storage 1306, such as a random access memory (RAM) or other dynamic storage device, coupled to bus 1304 for storing various information as well as instructions to be executed by processor 1305. The volatile storage 1306 also may be used for storing temporary variables or other intermediate information during execution of instructions by processor 1305. Computer platform 1301 may further include a read only memory (ROM or EPROM) 1307 or other static storage device coupled to bus 1304 for storing static information and instructions for processor 1305, such as basic input-output system (BIOS), as well as various system configuration parameters. A persistent storage device 1308, such as a magnetic disk, optical disk, or solid-state flash memory device is provided and coupled to bus 1304 for storing information and instructions.

In one or more embodiments, computer platform 1301 may be coupled via bus 1304 to a display 1309, such as a cathode ray tube (CRT), plasma display, or a liquid crystal display (LCD), for displaying information to a system administrator or user of the computer platform 1301. An input device 1310, including alphanumeric and other keys, is coupled to bus 1304 for communicating information and command selections to processor 1305. Another type of user input device is cursor control device 1311, such as a mouse, a trackball, or cursor direction keys for communicating direction information and command selections to processor 1305 and for controlling cursor movement on display 1309. This input device typically has two degrees of freedom in two axes, a first axis (e.g., x) and a second axis (e.g., y), that allows the device to specify positions in a plane.

In one or more embodiments, an external storage device 1312 may be coupled to the computer platform 1301 via bus 1304 to provide an extra or removable storage capacity for the computer platform 1301. In an embodiment of the computer system 1300, the external removable storage device 1312 may be used to facilitate exchange of data with other computer systems.

The invention is related to the use of computer system 1300 for implementing the techniques described herein. In an embodiment, the inventive system may reside on a machine such as computer platform 1301. According to one embodiment of the invention, the techniques described herein are performed by computer system 1300 in response to processor 1305 executing one or more sequences of one or more instructions contained in the volatile memory 1306. Such instructions may be read into volatile memory 1306 from another computer-readable medium, such as persistent storage device 1308. Execution of the sequences of instructions contained in the volatile memory 1306 causes processor 1305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1305 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1308. Volatile media includes dynamic memory, such as volatile storage 1306.

Common forms of computer-readable media include, for example, a floppy disk, a flexible disk, hard disk, magnetic tape, or any other magnetic medium, a CDROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 1305 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infrared transmitter to convert the data to an infrared signal. An infrared detector can receive the data carried in the infrared signal and appropriate circuitry can place the data on the data bus 1304. The bus 1304 carries the data to the volatile storage 1306, from which processor 1305 retrieves and executes the instructions. The instructions received by the volatile memory 1306 may optionally be stored on persistent storage device 1308 either before or after execution by processor 1305. The instructions may also be downloaded into the computer platform 1301 via Internet using a variety of network data communication protocols well known in the art.

The computer platform 1301 also includes a communication interface, such as network interface card 1313 coupled to the data bus 1304. Communication interface 1313 provides a two-way data communication coupling to a network link 1315 that is coupled to a local network 1315. For example, communication interface 1313 may be an integrated services digital network (ISDN) card or a modem to provide a data communication connection to a corresponding type of telephone line. As another example, communication interface 1313 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 1313 sends and receives electrical, electromagnetic or optical signals that carry digital data streams representing various types of information.

Network link 1313 typically provides data communication through one or more networks to other network resources. For example, network link 1315 may provide a connection through local network 1315 to a host computer 1316, or a network storage/server 1317. Additionally or alternatively, the network link 1313 may connect through gateway/firewall 1317 to the wide-area or global network 1318, such as an Internet. Thus, the computer platform 1301 can access network resources located anywhere on the Internet 1318, such as a remote network storage/server 1319. On the other hand, the computer platform 1301 may also be accessed by clients located anywhere on the local area network 1315 and/or the Internet 1318. The network clients 1320 and 1321 may themselves be implemented based on the computer platform similar to the platform 1301.

Local network 1315 and the Internet 1318 both use electrical, electromagnetic or optical signals that carry digital data streams. The signals through the various networks and the signals on network link 1315 and through communication interface 1313, which carry the digital data to and from computer platform 1301, are exemplary forms of carrier waves transporting the information.

Computer platform 1301 can send messages and receive data, including program code, through the variety of network(s) including Internet 1318 and LAN 1315, network link 1315 and communication interface 1313. In the Internet example, when the system 1301 acts as a network server, it might transmit a requested code or data for an application program running on client(s) 1320 and/or 1321 through Internet 1318, gateway/firewall 1317, local area network 1315 and communication interface 1313. Similarly, it may receive code from other network resources.

The received code may be executed by processor 1305 as it is received, and/or stored in persistent or volatile storage devices 1308 and 1306, respectively, or other non-volatile storage for later execution.

It should be understood that processes and techniques described herein are not inherently related to any particular apparatus and may be implemented by any suitable combination of software components. Further, various types of general-purpose software components may be used in accordance with the teachings described herein. It may also prove advantageous to extend the taxonomy as well as number of media Channels and Channel Actions to perform the method steps described herein. The present invention has been described in relation to particular examples, which are intended in all respects to be illustrative rather than restrict. Those skilled in the art will appreciate that many different combinations of software components, and software services will be suitable for practicing the present invention. For example, the described software may be implemented in a wide variety of programming or scripting languages, such as .NET, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized system and computer implemented method for security and quality assessment of Wireless Access Points used by wireless devices to communicate with remote servers over the computer networks. It is intended that the specification and examples be considered as exemplary only, with a true scope and spirit of the invention being indicated by the following claims.

REFERENCES

U.S. Pat. No. 8,526,368: Wi-Fi access point characteristics database

U.S. Pat. No. 8,483,704: Method and apparatus for maintaining a fingerprint for a wireless network U.S. Pat. No. 8,467,361: Intelligent wireless access point notification U.S. Pat. No. 8,032,939: Method and system for providing wireless vulnerability management for local area computer networks U.S. Pat. No. 7,971,253: Method and system for detecting address rotation and related events in communication networks U.S. Pat. No. 6,321,338: Network surveillance U.S. Pat. No. 7,856,656: Method and system for detecting masquerading wireless devices in local area computer networks http://en.wikipedia.org/wiki/Wi-Fi_Protected_Access http://en.wikipedia.org/wiki/Service_set_(802.11_network)

http://askubuntu.com/questions/40068/show-bssid-of-an-access-point http://coderrr.wordpress.com/2008/09/10/get-the-physicallocation-ofwireless-router-from-its-mac-address-bssid/ http://www.digininja.org/jasager/usage_web.phphttps://forum.open wrt.org/viewtopic.php?id=26512 http://cecs.wright.edu/~pmateti/InternetSecurity/Lectures/Wireless Hacks/Mateti-WirelessHacks.htm#_Toc77524652 http://www.maxi-pedia.com/how+to+break+MAC+filtering

What is claimed is:

1. A method for security risk assessment of wireless access point devices, the method comprising performing, by a computer system:

receiving, from one or more first devices, one or more reports of accesses to a first access point having a unique identifier, the one or more reports including, for each session of one or more access sessions by the one or more first devices, a count of reconnects during the each session;

determining, using the one or more reports, a security level of the first access point, the security level of the access point being determined according to a function that decreases with increasing counts of reconnects for the one or more access sessions; and transmitting, to one or more second devices, a message indicating the security level of the first access point.

2. The method of claim 1, wherein transmitting the message to the one or more second devices comprises transmitting an instruction to the one or more devices to not use the access point.

3. The method of claim 1, wherein transmitting the message to the one or more second devices comprises transmitting an instruction to the one or more devices to perform data access using the first access point using a virtual private network (VPN).

4. The method of claim 1, wherein transmitting the message to the one or more second devices comprises transmitting an interface to the one or more second devices, the interface indicating that the first access point is not secure and providing an interface element configured to invoke performing of data access using the first access point by means of a virtual private network (VPN).

5. A method for security risk assessment of wireless access point devices, the method comprising performing, by a computer system:
receiving, from one or more first devices, one or more reports of accesses to a first access point having a unique identifier, the one or more reports including, for each session of one or more access sessions a count of local internet protocol (IP) addresses used during each session;
determining, using the one or more reports, a security level of the first access point, the security level of the access point being determined according to a function that decreases with increase in the counts of the local IP addresses during the one or more sessions; and
transmitting, to one or more second devices, a message indicating the security level of the first access point.

6. The method of claim 5, wherein transmitting the message to the one or more second devices comprises transmitting an instruction to the one or more devices to not use the access point.

7. The method of claim 5, wherein transmitting the message to the one or more second devices comprises transmitting an instruction to the one or more devices to perform data access using the first access point using a virtual private network (VPN).

8. The method of claim 5, wherein transmitting the message to the one or more second devices comprises transmitting an interface to the one or more second devices, the interface indicating that the first access point is not secure and providing an interface element configured to invoke performing of data access using the first access point by means of a virtual private network (VPN).

9. A method for security risk assessment of wireless access point devices, the method comprising performing, by a computer system:
receiving, from one or more first devices, two or more reports of accesses to a first access point having a unique identifier, the two or more reports each corresponding to an access session of two or more access sessions, each report including a time of access for the access session to which the each report corresponds;
determining, using the one or more reports, a security level of the first access point, the security level of the access point being determined according to a function that increases with increase in one or more time differences between the times of access of the first access point included in the two or more reports; and
transmitting, to one or more second devices, a message indicating the security level of the first access point.

10. The method of claim 9, wherein transmitting the message to the one or more second devices comprises transmitting an instruction to the one or more devices to not use the access point.

11. The method of claim 9, wherein transmitting the message to the one or more second devices comprises transmitting an instruction to the one or more devices to perform data access using the first access point using a virtual private network (VPN).

12. The method of claim 9, wherein transmitting the message to the one or more second devices comprises transmitting an interface to the one or more second devices, the interface indicating that the first access point is not secure and providing an interface element configured to invoke performing of data access using the first access point by means of a virtual private network (VPN).

13. A method for security risk assessment of wireless access point devices, the method comprising performing, by a computer system:
receiving, from one or more devices, two or more reports of accesses to a first access point having a unique identifier, each report of the two or more reports including at least one of a device identifier and a user identifier,
determining, using the one or more reports, a security level of the first access point, the security of the access point being determined according to a function that increases with increase in a number of the at least one of the unique device identifiers and the unique user identifiers included in the two or more reports; and
transmitting, to one or more second devices, a message indicating the security level of the first access point.

14. The method of claim 13, wherein transmitting the message to the one or more second devices comprises transmitting an instruction to the one or more devices to not use the access point.

15. The method of claim 13, wherein transmitting the message to the one or more second devices comprises transmitting an instruction to the one or more devices to perform data access using the first access point using a virtual private network (VPN).

16. The method of claim 13, wherein transmitting the message to the one or more second devices comprises transmitting an interface to the one or more second devices, the interface indicating that the first access point is not secure and providing an interface element configured to invoke performing of data access using the first access point by means of a virtual private network (VPN).

17. A system for security risk assessment of wireless access point devices, the system comprising one or more processing devices and one or more memory devices operably coupled to the one or more processing devices, the one or more memory devices storing executable code effective to cause the one or more processing devices to:
receive, from two or more first devices, two or more reports of accesses to a first access point having a unique identifier, the two or more reports including, for each session of two or more access sessions by the two or more first devices, at least one of (a) a count of reconnects during the each session, (b) a count of local internet protocol (IP) addresses used during the each session, (c) a time of access of the first access point during the each session, and (d) at least one of a device identifier and a user identifier;
determine, using the two or more reports a security level of the first access point according to a function that at least one of (e) decreases with increase in the counts of reconnects during the two or more access sessions, (f) decreases with increase in the counts of local IP addresses used during the two or more access sessions, (g) increases with increase in one or more time differences between the times of access of the first access point during the two or more sessions, and (h) increases with increase in a number of the at least one of the unique device identifiers and the unique user identifiers included in the two or more reports;
transmitting, to one or more second devices, a message indicating the security level of the first access point.

18. The system of claim 17, wherein the executable code is further effective to cause the one or more processing devices to transmit the message to the one or more second devices by transmitting an instruction to the one or more devices to not use the access point.

19. The system of claim 17, wherein the executable code is further effective to cause the one or more processing devices to transmit the message to the one or more second devices by transmitting an instruction to the one or more devices to perform data access using the first access point using a virtual private network (VPN).

20. The system of claim 17, wherein the executable code is further effective to cause the one or more processing devices to transmit the message to the one or more second devices by transmitting an interface to the one or more second devices, the interface indicating that the first access point is not secure and providing an interface element configured to invoke performing of data access using the first access point by means of a virtual private network (VPN).

* * * * *